July 18, 1961
L. MERKER
2,992,931
METAL TITANATE COMPOSITION OF MATTER
Original Filed June 16, 1959
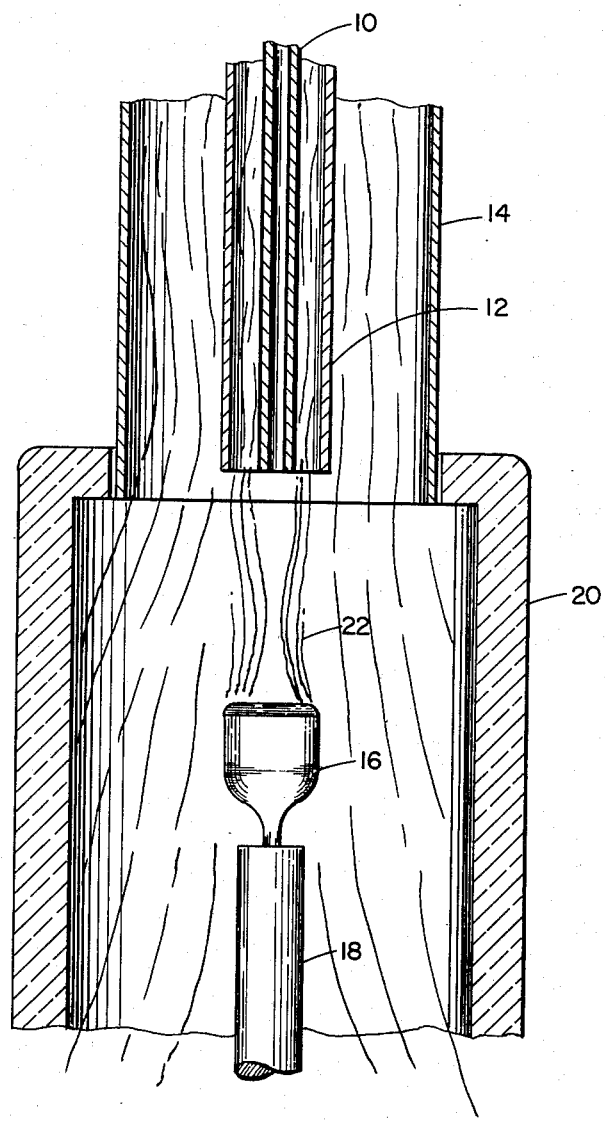
INVENTOR.
LEON MERKER
BY Robert L. Holiday
AGENT

United States Patent Office 2,992,931
Patented July 18, 1961

2,992,931
METAL TITANATE COMPOSITION OF MATTER
Leon Merker, Bronx, N.Y., assignor to National Lead Company, New York, N.Y., a corporation of New Jersey
Continuation of applications Ser. No. 820,796 and Ser. No. 820,802, June 16, 1959. This application May 26, 1960, Ser. No. 33,356
12 Claims. (Cl. 106—42)

This invention relates in general to monocrystalline metal titanate material. More specifically, it relates to a clear, colorless massive monocrystalline composition of matter comprising zinc orthotitanate and to its method of preparation. In addition it also relates to a clear massive monocrystalline composition possessing a green color.

A great amount of interest has been shown within the last few years in preparing various types of massive metal titanate single crystals which have relatively high indices of refraction and which may be cut into various useful optical objects such as lens, prisms, gemstones and the like. Among these prior art metal titanate single crystals are strontium and barium titanates. These materials and their methods of preparation are fully described and claimed in my patents U.S. 2,628,156 and U.S. 2,723,916.

In attempts to prepare various other metal titanate single crystals, it was found to be virtually impossible to prepare zinc orthotitanate single crystals, by previously known techniques, free from a multiplicity of opaque small flakes of insoluble material which gave an undesirable and unpleasant appearance to the crystals produced. Such crystals were not clear but cloudy and therefore were undesirable and unsuitable for use as any of the optical objects mentioned above. Moreover, in previous attempts to prepare metal titanate single crystals of various colors, it has been found virtually impossible to prepare single crystals possessing a clear green color. Such a colored crystal is extremely desirable for commercial use as a gemstone. Although various coloring agents have been added to a variety of metal titanate compositions, none have produced a single crystal having a clear green color.

An object of the instant invention therefore is to produce massive, clear zinc titanate single crystals free from opaque flakes of insoluble material. Another object of this invention is to produce clear, colorless single crystals of zinc titanate which are commercially usable as optical objects. Another object of this invention is to provide a method for producing such crystals. Still another object is to provide a simple and economical method for producing a single crystal metal titanate composition having a clear green color. Another object of this invention is to produce clear green single crystals which are commercially usable as gemstones. These and other objects will become more apparent from the following more complete description of the instant invention.

Broadly, this invention contemplates a highly refractive composition of matter consisting essentially of a clear, colorless monocrystalline mass of zinc orthotitanate, titanium dioxide and a metal oxide selected from the group consisting of magnesium oxide, zirconium oxide, calcium oxide and aluminum oxide.

This invention further contemplates a method for producing said clear, colorless monocrystalline composition of matter in the form of a boule which comprises periodically introducing a powdered mixture consisting essentially of zinc orthotitanate and a metal oxide selected from the group consisting of magnesium oxide, calcium oxide, zirconium oxide and aluminum oxide into a stream of oxygen, surrounding said stream of oxygen with a stream of hydrogen, surrounding said stream of hydrogen with a stream of oxygen and forming an oxidizing flame having a central oxygen cone, said flame producing a temperature from about 1520° C. to about 1580° C. in said oxygen cone, melting said powdered mixture at said temperature and crystallizing the molten mixture adjacent to said cone and recovering said crystallized material as a clear, colorless, monocrystalline boule.

In preparing the colorless composition, it has been found that the zinc orthotitanate employed should be substantially on composition, i.e., 2 moles of zinc oxide for each mole of titanium dioxide. When such a composition is used to prepare a boule, apparently a small amount of the zinc is lost from the system so that the boule produced contains from 2.0% to 7.5% excess $TiO_2$ over the theoretical amount of $TiO_2$ found in the zinc orthotitanate compound. This excess $TiO_2$ is present in the boule in solid solution with the zinc orthotitanate.

The amount of the metal oxide present in the zinc orthotitanate single crystal may vary somewhat. However, it has been found that for effective and desirable results the following amounts by weight should be present: 1.0% to 4.5% MgO, 0.05% to 0.5% CaO, 0.05% to 2.0% $ZrO_2$ and 0.5% to 2.5% $Al_2O_3$.

This invention also contemplates a highly refractive composition of matter consisting essentially of a clear, green, monocrystalline mass of zinc orthotitanate, titanium dioxide, chromium oxide and a metal oxide selected from the group consisting of magnesium oxide, zirconium oxide, calcium oxide and aluminum oxide. The chromium oxide is added as the coloring agent to give the clear crystal a green color. It has been found that the amount of chromium oxide, added as chromic trioxide ($Cr_2O_3$) is dependent upon the depth of color desired. Useful amounts of $Cr_2O_3$ present in the boule are from 0.02% to 1.0% by weight to produce pale to very deep green colors. Amounts in excess of 1.0% $Cr_2O_3$ by weight should be avoided since larger amounts tend to produce such dark green colors that they are not desirable for commercial use as gemstones.

The terms "zinc orthotitanate" and "metal oxide" are definitive of pure material and material which contains impurities, added coloring or modifying agents, either present or added, which are of a nature or in amount as to not affect the monocrystalline structure nor alter the desired color or physical properties of the monocrystalline material produced. In most cases the impurities are held to a minimum and ordinarily will not exceed a total of a few tenths of a percent, and modifying and coloring agents are added in the amount necessary to produce the desired effect.

A preferred type of apparatus which may be successfully used in the instant invention is shown in the drawing. In the apparatus shown in the drawing, the burner comprises three substantially concentric tubes 10, 12, and 14. The powdered zinc titanate and metal oxide mixture is introduced through the center tube 10 with a portion of the oxygen. The remainder of the oxygen is introduced through the outermost tube 14. The hydrogen is introduced through the intermediate tube 12. The boule 16 is formed on a pedestal 18 of suitable refractory material such as alumina or zirconia and, as the boule grows, the pedestal 18 is lowered so that the top of the boule always remains at about the same location in the flame.

The boule 16 and top of the pedestal 18 are surrounded by a chamber 20 of alumina or the like and this chamber preferably surrounds the lower end of the outer tube 14. The gases are preferably fed at such rates that the flame fills and extends through the entire chamber 20 around the boule and in this way the temperature and other conditions around the boule are kept substantially constant. It has been found that smaller flames may be unsteady due to currents within the chamber and variations in the flame may cause damage to the boule.

In practice, the powdered zinc titanate and metal oxide mixture is generally introduced periodically into the pipe 10 with a minor portion of the oxygen, and the major portion of the oxygen is introduced through pipe 14. Hydrogen is introduced through the pipe 12 to provide the proper temperature and large flame. In one burner the oxygen in the inner pipe 10, the hydrogen in the intermediate pipe 12 and the oxygen in the outer pipe 14 are introduced in the proportions 4.5:10:10 respectively.

An oxygen cone 22 forms within the flame below the concentric tubes and the pedestal 18 is preferably positioned so that the molten top of the boule 16 is at or near the point of the cone 22. In order to form such a single crystal it is desirable, but not necessary, to first form a seed on the pedestal and then gradually build up the amount of molten material on the seed. Such a procedure allows the crystal to build up upon itself gradually increasing in diameter until a boule or carrot-shaped single crystal is formed. The size of the orifices of the oxygen-hydrogen torch determine the size of the intensely heated reaction zone which, in turn, determines the diameter of the carrot-shaped crystal produced.

In order to fuse the powdered mixture to form a boule it has been found that the temperature of the flame should be maintained somewhat above the melting point of the powdered mixture, but should not exceed a temperature at which the molten mixture tends to flow over the edges of the molten pool of material at the top of the boule. The flame temperature may be maintained by adjusting the quantity and rates of flow of both the hydrogen and oxygen gases but it is important that the flame be kept as constant and quiet as possible. The temperature should be held between about 1520° C. and 1580° C.

It is preferred to employ the mixture in finely powdered form. The zinc orthotitanate and metal oxide feed material should be substantially free from objectionable or incompatible impurities which detrimentally affect the crystal structure, color or other properties of the crystal; and should be finely divided and fairly uniform in size. For most efficient results, the feed material should possess an open structure with units capable of being rapidly melted, an especially satisfactory ultimate unit particle size of the material being less than 1 micron. Aggregates of these small particles greater than 100 mesh should also be avoided as they do not tend to melt completely. The feed material should be free-flowing in order to feed properly.

After the boule has been grown, it is annealed under oxidizing conditions at a temperature from 500° C. to 1100° C. to remove the strains. The time of annealing will vary depending upon the size of the boule and the temperature employed. However, it has been found that from 2 hours to 180 hours are satisfactory for producing relatively strain-free, transparent, clear, colorless crystals.

In order to more fully describe the instant invention the following examples are presented:

EXAMPLE 1

A powdered mixture containing 96.0% zinc orthotitanate and 4.0% magnesium oxide was used as the feed material for forming a clear, colorless single crystal.

Using an oxygen-hydrogen burner having concentric orifices, the center orifice carrying the oxygen gas and powdered feed material entrained in the oxygen, the outermost orifice carrying the rest of the oxygen gas, and the intermediate orifice carrying the hydrogen gas, a single crystal boule was prepared. The total gas flow of oxygen was 14.5 liters per minute, 4.5 liters through the center orifice and 10 liters through the outermost orifice, while the flow of hydrogen was 10 liters per minute. After 5 hours the boule was cooled and then subsequently annealed in an oxidizing atmosphere at a temperature of 800° C. for 2 hours to remove the strains. The annealed boule had a clear substantially colorless appearance and was free from opaque insoluble flakes of foreign matter.

The clear, colorless monocrystalline composition has an average index of refraction of 2.22 and a Moh hardness value of 6.5. This colorless single crystal material, because of its clarity is particularly suitable for cutting into gemstones and other optical objects such as lenses and prisms.

EXAMPLES 2–10

The procedure used in Example 1 was repeated using various combinations of feed materials. The compositions of the feed materials employed and the operational details are recorded in Table I along with the data of Example 1.

In all cases the monocrystalline boules produced were clear and colorless and free from cloudiness.

In contrast to the examples presented above, which all employed various amounts of the metal oxides, boules prepared without the metal oxide addition were cloudy and contained small flakes of opaque insoluble material. These cloudy boules were not satisfactory for use as gemstones.

*Table I*

|  | Ex. 1 | Ex. 2 | Ex. 3 | Ex. 4 | Ex. 5 | Ex. 6 | Ex. 7 | Ex. 8 | Ex. 9 | Ex. 10 |
| --- | --- | --- | --- | --- | --- | --- | --- | --- | --- | --- |
| Feed composition: |  |  |  |  |  |  |  |  |  |  |
| Percent $Zn_2TiO_4$ | 96.0 | 98.4 | 99.9 | 99.8 | 99.0 | 99.62 | 98.94 | 98.9 | 95.7 | 95.72 |
| Percent CaO |  |  | 0.1 | 0.2 |  |  |  |  |  | 0.08 |
| Percent MgO | 4.0 | 1.6 |  |  |  |  |  | 0.1 | 4.0 | 4.2 |
| Percent $Al_2O_3$ |  |  |  |  | 1.0 | 0.38 |  |  |  |  |
| Percent $ZrO_2$ |  |  |  |  |  |  | 1.06 | 1.0 | 0.3 |  |
| Annealing: |  |  |  |  |  |  |  |  |  |  |
| Temp., ° C | 800 | 800 | 800 | 800 | 1,000 | 750 | 650 | 800 | 800 | 900 |
| Time, Hours | 2 | 2 | 2 | 2 | 2 | 2 | 5 | 24 | 72 | 5 |
| Boule composition: |  |  |  |  |  |  |  |  |  |  |
| Percent $Zn_2TiO_4$ | 91.0 |  |  | 95.3 |  | 95.42 |  | 95.4 |  |  |
| Percent $TiO_2$ | 5.0 |  |  | 4.5 |  | 4.2 |  | 3.5 |  |  |
| Percent CaO |  |  |  | 0.2 |  |  |  |  |  |  |
| Percent MgO | 4.0 |  |  |  |  |  |  | 0.1 |  |  |
| Percent $ZrO_2$ |  |  |  |  |  | 0.38 |  | 1.0 |  |  |

In order to show the effect of adding chromic trioxide to the composition to produce clear green boules, the following examples are presented:

EXAMPLE 11

A powdered mixture containing 96.97% zinc orthotitanate, 0.03% chromic trioxide and 3.0% calcium oxide, by weight, was used as the feed material for forming a green single crystal.

Using an oxygen-hydrogen burner having concentric orifices, the center orifice carrying the oxygen gas and powdered feed material entrained in the oxygen, the outermost orifice carrying the rest of the oxygen gas, and the intermediate orifice carrying the hydrogen gas, a single crystal boule of the above composition was prepared. The total gas flow of oxygen was 14.5 liters per minute, 4.5 liters through the center orifice and 10 liters through the outermost orifice, while the flow of hydrogen was 10 liters per minute. After 5 hours the boule was cooled and then subsequently annealed in an oxidizing atmosphere at a temperature of 800° C. for 2 hours to remove the strains. The annealed boule possessed a clear, pale green color.

The clear green monocrystalline composition has an average index of refraction of 2.22 and a Moh hardness value of 6.5. This green single crystal material, because of its clarity and color is particularly suitable for cutting into gemstones.

EXAMPLES 12–16

The procedure used in Example 11 was repeated using various combinations of feed materials. The compositions of the feed materials employed and the operational details are recorded in Table II along with the data of Example 11.

In all cases the monocrystalline boules produced possessed clear green colors varying in depth of color which was dependent upon the amount of chromium oxide used.

Table II

| | Ex. 11 | Ex. 12 | Ex. 13 | Ex. 14 | Ex. 15 | Ex. 16 |
|---|---|---|---|---|---|---|
| Feed composition: | | | | | | |
| Percent $Zn_2TiO_4$ | 96.97 | 99.72 | 98.8 | 98.3 | 99.78 | 97.17 |
| Percent $Cr_2O_3$ | 0.03 | 0.2 | 0.2 | 0.2 | 0.02 | 0.13 |
| Percent CaO | | 0.08 | | | 0.20 | 0.1 |
| Percent MgO | 3.0 | | | | | 2.6 |
| Percent $Al_2O_3$ | | | | 1.5 | | |
| Percent $ZrO_2$ | | | 1.0 | | | |
| Annealing: | | | | | | |
| Temp., °C | 800 | 900 | 650 | 800 | 650 | 800 |
| Time, Hours | 2 | 5 | 12 | 24 | 72 | 2 |
| Boule composition: | | | | | | |
| Percent $Zn_2TiO_4$ | 93.47 | 95.52 | 94.2 | 92.9 | | |
| Percent $TiO_2$ | 3.5 | 4.2 | 4.6 | 5.4 | | |
| Percent $Cr_2O_3$ | 0.03 | 0.2 | 0.2 | 0.2 | | |
| Percent CaO | | 0.08 | | | | |
| Percent MgO | 3.0 | | | | | |
| Percent $Al_2O_3$ | | | | 1.5 | | |
| Percent $ZrO_2$ | | | 1.0 | | | |
| Boule color | (1) | (2) | (2) | (2) | (1) | (3) |

¹ Pale green.
² Dark green.
³ Medium green.

From the above description, it is apparent that the present invention provides a clear, colorless, monocrystalline composition of matter consisting essentially of zinc orthotitanate, titanium dioxide and a metal oxide having a high index of refraction and high hardness. The single crystals produced are massive and therefore may be used for many purposes, including the preparation of optical objects and the process is simple and economical to employ. It is also apparent that the present invention provides a clear, green colored, monocrystalline composition of matter consisting essentially of zinc orthotitanate, chromium oxide, titanium dioxide and a metal oxide having a high index of refraction and high hardness. The single crystals of this composition of matter are massive and because of their clear green color are useful for the production of gemstones.

This application is a continuation of my copending applications Serial No. 820,796 and Serial No. 820,802, both filed on June 16, 1959.

While this invention has been described and illustrated by the examples shown, it is not intended to be strictly limited thereto, and other modifications and variations may be employed within the scope of the following claims.

I claim:

1. A highly refractive composition of matter consisting essentially of a monocrystalline mass of zinc orthotitanate, titanium dioxide and a metal oxide selected from the group consisting of magnesium oxide, zirconium oxide, calcium oxide and aluminum oxide, the titanium dioxide in said mass being present in amount from 2.0% to 7.5% by weight, the magnesium oxide in amount from 1.0% to 4.5% by weight, the calcium oxide in amount from 0.05% to 0.5% by weight, the zirconium dioxide in amount from 0.05% to 2.0% by weight and the aluminum oxide in amount from 0.5% to 2.5% by weight of said monocrystalline mass.

2. Composition according to claim 1 in which the metal oxide present in said monocrystalline mass is magnesium oxide.

3. Composition according to claim 1 in which the metal oxide present in said monocrystalline mass is calcium oxide.

4. Composition according to claim 1 in which the metal oxide present in said monocrystalline mass is zirconium oxide.

5. Composition according to claim 1 in which the metal oxide present in said monocrystalline mass is aluminum oxide.

6. A method for producing a monocrystalline composition of matter in the form of a boule which comprises periodically introducing a powdered mixture consisting essentially of zinc orthotitanate and a metal oxide selected from the group consisting of magnesium oxide, calcium oxide, zirconium oxide and aluminum oxide into a stream of oxygen, surrounding said stream of oxygen with a stream of hydrogen, surrounding said stream of hydrogen with a stream of oxygen and forming an oxidizing flame having a central oxygen cone, said flame producing a temperature from about 1520° C. to about 1580° C. in said oxygen cone, melting said powdered mixture at said temperature and crystallizing the molten mixture adjacent to said cone and recovering said crystallized material as a monocrystalline boule, said magnesium oxide present in said mixture in amount from 1.0% to 4.5% by weight, calcium oxide in amount from 0.05% to 0.5% by weight, zirconium dioxide in amount from 0.05% to 2.0% by weight and aluminum oxide in amount from 0.5% to 2.5% by weight of said mixture.

7. Method according to claim 6 in which the crystallized material is subsequently annealed by subjecting the boule to an oxidizing treatment at a temperature from about 500° C. to about 1100° C.

8. A highly refractive clear green composition of matter consisting essentially of a monocrystalline mass of zinc orthotitanate, titanium dioxide, chromium oxide and a metal oxide selected from the group consisting of magnesium oxide, zirconium oxide, calcium oxide and aluminum oxide, the titanium dioxide in said mass being present in amount from 2.0% to 7.5% by weight, the chromium oxide in amount from 0.02% to 1.0% by weight, the magnesium oxide in amount from 1.0% to 4.5% by weight, the calcium oxide in amount from 0.05% to 0.5% by weight, the zirconium dioxide in amount from 0.05% to 2.0% by weight and the aluminum oxide in amount from 0.5% to 2.5% by weight of said monocrystalline mass.

9. Composition according to claim 8 in which the metal oxide employed is magnesium oxide.

10. Composition according to claim 8 in which the metal oxide employed is calcium oxide.

11. Composition according to claim 8 in which the metal oxide employed is zirconium oxide.

12. Composition according to claim 8 in which the metal oxide employed is aluminum oxide.

References Cited in the file of this patent

UNITED STATES PATENTS

| 1,775,868 | Sandmeier | Sept. 16, 1930 |
| 2,122,180 | Lederle et al. | June 28, 1938 |
| 2,723,916 | Lynd et al. | Nov. 15, 1955 |